United States Patent [19]

Priesemuth

[11] 4,103,384
[45] Aug. 1, 1978

[54] WINDSHIELD WIPER

[76] Inventor: Wolfgang Priesemuth, Postkamp 13, 221 Itzehoe-Nordoe, Fed. Rep. of Germany

[21] Appl. No.: 730,750

[22] Filed: Oct. 8, 1976

Related U.S. Application Data

[62] Division of Ser. No. 456,976, Apr. 1, 1974, Pat. No. 4,019,216.

[30] Foreign Application Priority Data

Mar. 30, 1973 [DE] Fed. Rep. of Germany ....... 2315891

[51] Int. Cl.² .............................................. B60S 1/46
[52] U.S. Cl. .............................. 15/250.03; 15/250.04; 15/250.4; 15/250.42
[58] Field of Search ............. 15/250.42, 250.4, 250.41, 15/250.01, 250.03, 250.04, 250.22

[56] References Cited

U.S. PATENT DOCUMENTS

| 2,085,608 | 6/1937 | Roprick | 15/250.40 |
| 2,543,383 | 2/1951 | Scinta | 15/250.40 |
| 2,798,242 | 7/1957 | Zeieninger | 15/250.40 |
| 3,032,797 | 5/1962 | Presser | 15/250.04 |
| 3,139,644 | 7/1964 | Smith | 15/250.42 |

Primary Examiner—Robert W. Jenkins
Attorney, Agent, or Firm—Walter Becker

[57] ABSTRACT

A windshield wiper having a wiper blade formed with a wiping edge and attached to one or more spring bows or bails along which wiper blade on at least one side of the wiping edge facing the windshield to be wiped there is provided a pad adapted to store a cleaning fluid and evenly to release the same onto the windshield during the wiping operation. The pad is attached to a backing strip provided with fastening means projecting towards the spring bows or bails and facing each other from opposite sides of the backing strip in paired juxtaposition while the fastening means cooperate with the clip means extending across the back of the wiper blade.

11 Claims, 18 Drawing Figures

WINDSHIELD WIPER

This is a division of co-pending application Ser. No. 456,976 — Priesemuth filed Apr. 1, 1974, now U.S. Pat. No. 4,019,216 — Priesemuth, issued Apr. 26, 1977 (Monday).

The invention relates to a windshield wiper comprising a wiper blade formed with a wiping edge and attached to one or more spring bows or bails, and a pad extending along the length of the wiper blade on at least one side of the wiping edge facing the windshield with which it is adapted to make surface contact, said pad being adapted to store a cleaning fluid and evenly to release the same onto the windshield surface during the wiping operation.

In practice, this windshield wiper has generally given a good account of itself. It distributes the cleaning fluid evenly across the windshield and enables even considerably fould windshields to be quickly and satisfactorily cleaned by a relatively small amount of cleaning fluid. However, it has been found that in some types of wiper the affixation of the pad is rather awkward. Also, in the case of some windshield wipers the quality of the material used for making the wiper blade is such that after a certain period of use of the wiper, the pad tends to work loose.

It is, therefore, an object of the present invention to provide a windshield wiper of the above mentioned general type in which the pad is easily and reliably attachable to the wiper blade.

These and other objects and advantages of the invention will appear more clearly from the following specification in connection with the accompanying drawings, in which.

Figure 1:
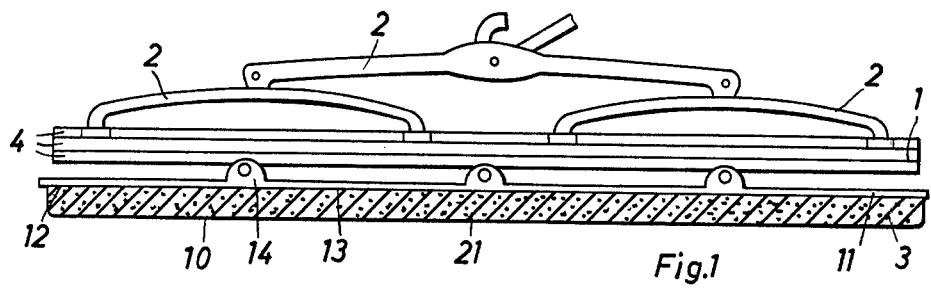
FIG. 1 is a windshield wiper according to the invention with a pad just prior to being attached to the wiper blade.
Figure 2:
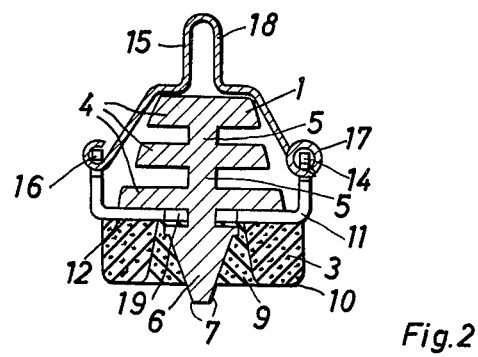
FIG. 2 is a cross section of a windshield wiper with the pad secured thereto.
Figure 3:
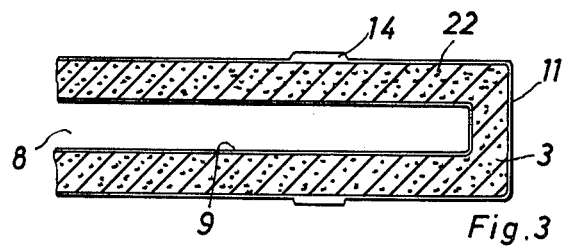
FIG. 3 is a view of one end of a pad from below.
Figure 4:
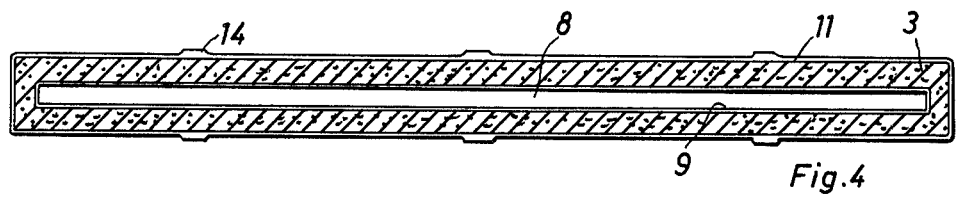
FIG. 4 is a view of a pad containing a plurality of open pores.
Figure 5:
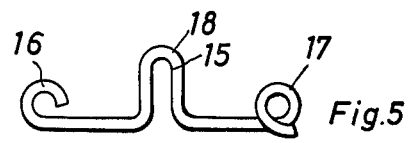
FIG. 5 is a clip for securing the pad.
Figure 6:
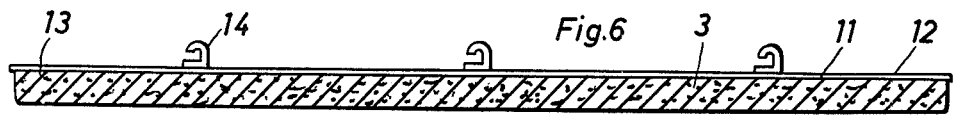
FIG. 6 is a side view of a pad on its backing strip.
Figure 7:
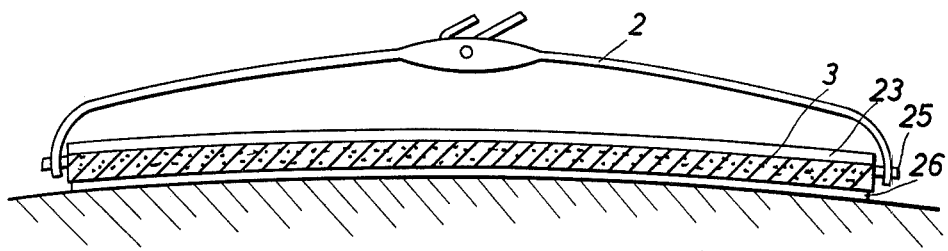
FIG. 7 is a side view of a windshield wiper having a roll-type wiper blade.
Figure 8:
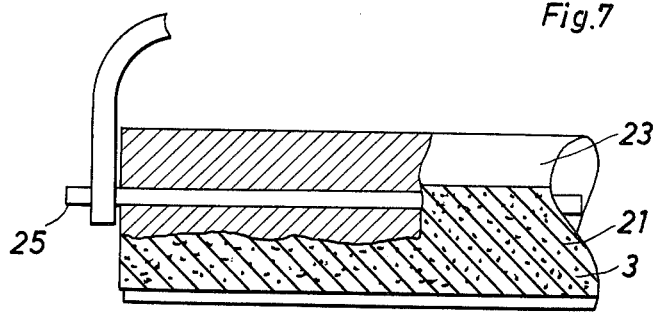
FIG. 8 shows one end of the roll of a roll-type wiper partly in view and partly in section.

The windshield wiper according to the invention is characterized primarily in that the pad is attached to a backing strip provided with fastening means projecting towards the bails and located in paired juxtaposition on opposed sides of the backing strip, said fastening means cooperating with spring clips which extend across the back of the wiper blade.

In such an arrangement of the wiper blade the pad is held firmly against the lowermost flange of the blade by the spring clips. Even after lengthy use it cannot work itself loose on the flange. For replacing the wiper blade, the clips can be detached from the fastening means by a simple manipulation, permitting the pad to be slidably removed from the wiper blade.

In a preferred embodiment of the invention the wiper blade has the form of a roll adapted to tilt about its longitudinal axis in the spring bail, the nose of the wiper blade projecting from the roll towards the windshield and the surface of the roll adjacent the nose on at least one side being covered by the pad which bears on the windshield surface during the wiping operation.

A tiltably mounted roll has the advantage that the pad can be urged into contact with the windshield with considerable pressure without thereby causing the nose of the wiper blade to be very considerably deformed. The embodiment of the wiper blade as a roll is simpler than that comprising a plurality of transverse flanges and it can, therefore, also be more cheaply produced.

Referring now to the drawings in detail, the windshield wiper shown in the drawings consists substantially of a wiper blade 1, spring bows or bails 2, and a pad 3. The wiper blade 1 is formed with a plurality of parallel transverse webs or flanges 4, and the uppermost flange is secured to the bail 2. The centers of the flanges 4 are interconnected by a narrow web 5 which extends beyond the bottom flange towards the windshield and terminates in a wedge-section lip 6. During the wiping action, the web 5 and the lip 6 are deformed and bend over sideways, permitting the wiping faces 7 to slide across the windshield surface. In order to assist the elastic flexing motion of the web 5, the portions intermediate the flanges 4 are thin.

The pad 3 has a narrow elongated central opening 8. This is so contrived that the lip 6 of the wiper blade can be pushed through the opening. If the material of the pad is not sufficiently elastically flexible, a gap remains between the wiping faces 7 and the sides 9 of this central opening 8 so that deflection of the lip 6 is not impeded.

The pad 3 has the form of a rectangular section open-pore strip of rubber, synthetic plastics or the like. Its thickness is designed to ensure that in the underformed state, the edge of the lip 6 of the web 5 will project beyond the underside 10 of the pad facing the windshield. During the wiping action the web 5 is deflected sufficiently for the underside 10 to make contact with and press on the windshield surface and for the wiping face 7 to be pressed into flush alignment with the underside 10 of the pad.

The pad 3 is attached to a backing 11 made of thin spring steel strip. The underside 12 of the backing 11 covers the top 13 of the pad 3 facing the bottom flange 4. The underside 12 is formed with fasteners 14 bent upwards towards the spring bails 2. These fasteners may either contain an eye or they may have a hook-shaped end. The fasteners 14 face each other in pairs from opposite sides of the backing strip 11. The fasteners 14 of each pair are connected by a spring clip 15 which spans the width of the wiper blade 1 and thus secures the pad 3 to the blade. The spring clips 15 may be formed at each end with a hook 16 or with an eyelet 17 for cooperation with the eyelets or hooks of the fasteners 14. The two ends of the clips are pushed elastically downwards towards the pad 3 and their restoring spring force thus pulls the pad 3 up against the bottom flange 4. Furthermore, the spring clips 15 are formed with a narrow loop 18 centrally at the top which imparts considerable resilience to the clip in the direction in which the loop is deformed.

The backing strip 11 has a central slot 19 which conforms in size with the central opening 8, so that the lip 6 of the blade 1 can also pass through this slot 19.

The lip 6 of the wiper blade moves across the windshield surface. At the same time a liquid cleaning fluid, such as water, with or without an additive, is sprayed on the windshield. The pad 3 which is made of a foamed synthetic plastics material containing large pores 21 soaks up the cleaning fluid. The wiping motion deflects the web 5 until the wiping faces 7 are flush with the underside 10 of the pad 3 which is pressed against the windshield by the pressure exerted by the spring bails 2. The cleaning fluid which has been soaked up is squeezed evenly out of the pores 21 during the wiping action and wets the windshield surface which is to be cleaned. The wiper is thus able to clean the uniformly wetted windshield surface by the wiping action of the wiping faces 7.

The pad could also consist of a rubber-like material having a contact surface containing honeycomb cells separated by thin webs. During the wiping process, these cells fill with cleaning fluid and later release the fluid evenly on to the wiped windshield surface.

When the pad 3 has been secured, the lip 6 of the wiper blade is threaded through the slot 19 and the central opening 8 until the backing strip 11 bears against the underside of the bottom flange of the wiper blade 1. The eyelets 17 in the clips 15 are then attached to the fasteners 14. Hence the clips 15 will bear down on the top flange 4 of the wiper blade 1 and will thus establish a reliable connection between the pad 3 and the wiper blade 1.

The wiper blade 1 may alternatively have the form of a roll 23 which is axially pierced by a hole 24 having a suitable cross section for the reception of an axle 25 which projects from each end 26 of the roll. In an appropriate position on its circumference the roll 23 is formed with a wiping lip 6 for cleaning the windshield. On each side of the lip 6 the circumference of the roll 23 carries a pad 3 which in this embodiment may similarly consist of a large pored foamed plastics or a rubber material containing honeycomb cells.

Figure 11:
FIG. 11 is a view of an axle which extends from end to end through a roll.
Figure 11A:
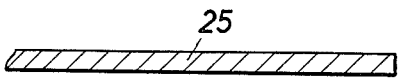
FIG. 11A is an end view of a flat section steel configuration of the axle in FIG. 11.
Figure 11B:
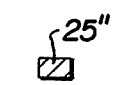
FIG. 11B is an end view of a square configuration of the axle in FIG. 11.
Figure 12:
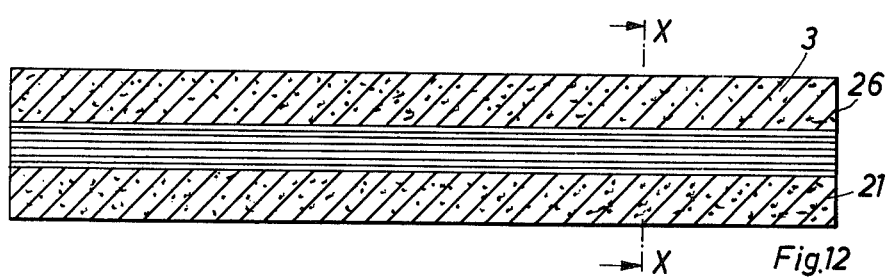
FIG. 12 is a view of the wiping face of a roll as seen from below.
Figure 13:
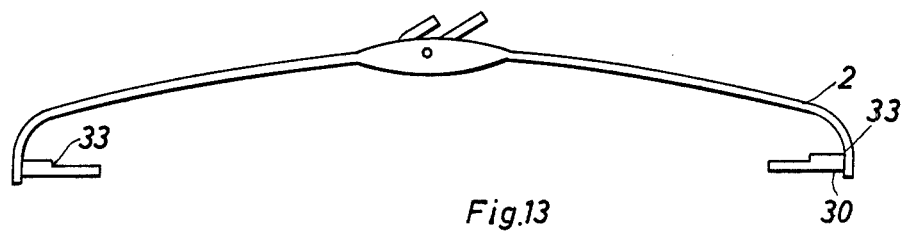
FIG. 13 is a view of a spring bail fitted with stub axles.

Mountings 27 are provided at opposite ends of the spring bail 2 for the reception of the ends of the axle 25 projecting from the ends 26 of the roll. If the axle 25 consists of a flat steel section 25' (FIG. 11A) or a square section 25" (FIG. 11B), then the hole 24 will be conformably shaped to provide a firm connection between the roll 23 and the axle 25 by the resultant friction between the axle and the walls of the hole. Each mounting 27 has a substantially circular opening 28 of the diameter sufficient to accommodate the width of the steel section. The edges of the section are thus located and guided by the internal circumference of the opening 28. Projections or cams 29 with semicircular ends may be arranged to extend from the above and below into the opening 28. These projections 29 serve first of all to assist in supporting the axle 25 and secondly they function as stops limiting the rotation of the axle to a predetermined angle of tilt. The described form of construction of this mounting 27 may be adopted at one or both ends of the bail 2.

The hole 24 may extend through the roll 23 in a central or eccentric position. Moreover, the axle 25 may be made of any standard profiles available in the trade, and the design of the mounting 27 will then depend upon the configuration of the selected profile or section. The axle may also consist of some material other than steel. Besides metal, materials such as plastics or hard rubber may be considered.

The roll 23 may also be mounted on axle pins 30 fixed in the mounts 27 of the spring bail 2. A compression spring 32 contained in an appropriate bore 31 in the roll 23 may then apply thrust to each axle pin in the direction towards the bearing 27, and each axle pin 30 may be formed with a projection 33 which functions as a stop for limiting rotation by engaging a recess 34 occupying a quadrant in the internal wall of the bore 31.

Figure 9:
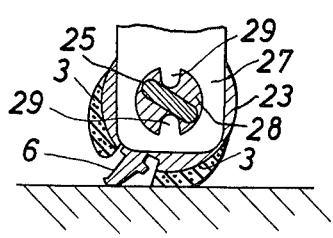
FIG. 9 is a side view of the mounting of a roll in the spring bail.
Figure 10:
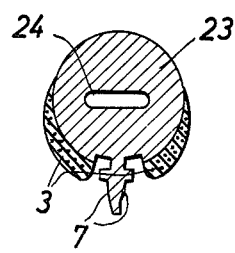
FIG. 10 is a cross section taken on the line X — X in FIG. 12.
Figure 14:
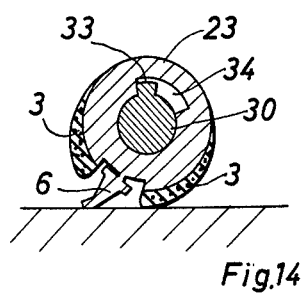
FIG. 14 is a section of a roll taken on the line XIV — XIV in FIG. 16.
Figure 15:
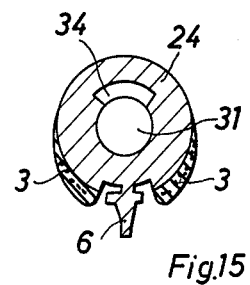
FIG. 15 is a cross section of a roll similar to that in FIG. 14, but without the stub axle.
Figure 16:
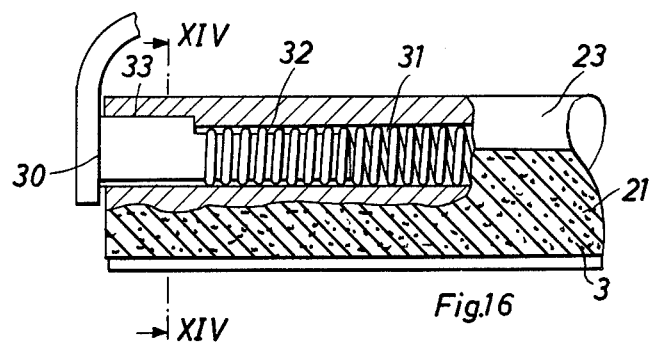
FIG. 16 shows a windshield wiper and inserted wiper roll partly in section and partly in view.

When the windshield is being wiped, the roll 23 tilts into the position shown in FIGS. 9 and 14, in which the wiping face of the lip 6 wipes the windshield. At the same time, the pad 3 on the circumferential surface of the roll 23 is pressed against the windshield and releases the cleaning fluid that is stored in its pores. When the wiper reverses its direction of motion, the roll 23 tips over to the side to bring the other face 7 of the lip into wiping contact with the windshield. At the same time, the pad 3 on this side of the roll is brought into pressure contact with the windshield. The angle of tilt is limited either by the projection 39 which intercepts the axle 25 or by the quadrant-shaped recess 34 which limits the angle of tilt of the projection 33.

Instead of making use of springs 32, cooperation with the mounts 27 may also be obtained by providing the roll 23 with a steel axle section which engages the mount 27. It is also possible to make use of the elastic thrust of the rubber of the roll 23 for keeping the axle pins 30 in engagement with their mountings 27. In such a case the axle pins 30 should be supported inside the roll 23 in such a way that the elastic thrust of the rubber is sufficient to keep the pins 30 in the mountings 27.

Various forms of construction of the roll may be selected. The roll may, for instance, have a round or an oval cross section. Alternatively, some other cylindrical body may be used, provided it ensures that in the tilted position of the roll, the pad 3 will bear satisfactorily against the windshield surface.

It is, of course, to be understood that the present invention is, by no means, limited to the specific showing in the drawings but also comprises any modifications within the scope of the appended claims.

What I claim is:

1. A windshield wiper which includes: spring bow means, a wiper blade in the form of a roll having wiping edge means and being connected to said spring bow means, a pad fastened to said roll and extending substantially along the length of said roll on at least that one side of said wiping edge means which faces the windshield to be contacted thereby, said pad being adapted to receive and store a cleaning fluid and substantially evenly to release the same onto the windshield to be wiped, rotary support means between the ends of said roll and the free ends of said spring bow means for holding said roll rotatable about its longitudinal axis in said spring bow means, and a wiper blade lip on said wiping edge means projecting from said roll towards the windshield to be wiped, the surface of said pad adjacent at least one side of said lip bearing on the windshield surface to be wiped during the wiping operation of said windshield wiper.

2. A windshield wiper according to claim 1, in which said rotary support means is provided with stop means for limiting rotation of said roll about its axis to a given pivot angle of tilt.

3. A windshield wiper according to claim 2, in which said rotary support means have the form of a backing strip extending longitudinally through said roll and being frictionally secured therein, mountings being arranged in said spring bow means and receiving the ends of said backing strip.

4. A windshield wiper according to claim 3, in which said backing is a steel section frictionally embedded in said roll, said spring bow means having a circular opening receiving and journalling said backing strip, said spring bow means also having projections for limiting rotary motion of the roll to within prescribed angular limits.

5. A windshield wiper according to claim 4, in which said projections extend towards the center of said circular opening and have semicircular ends to afford support to said backing strip inside said circular opening.

6. A windshield wiper according to claim 5, in which said backing strip is a length of flat section steel.

7. A windshield wiper according to claim 2, in which said rotary support means include axle pin means projecting into each end of said roll and being mounted in said spring bow means, said rotary support means being adapted to limit rotary motion of said roll to a prescribed angle.

8. A windshield wiper according to claim 7, which includes mountings in said spring bow means and have said axle pin means secured therein so that they cannot rotate, at least one of said axle pin means having a projection inside said roll, said roll having a recess therein cooperating with said projection for limiting rotation of said roll to a prescribed angle.

9. A windshield wiper according to claim 8, in which said axle pin means are provided with shoulder means, and which includes compression spring means extending through said roll and bearing against said shoulder means to urge the same in a direction keeping them in engagement with said mountings in said spring bow means.

10. A windshield wiper according to claim 2, in which said rotary support means comprise a steel section provided with at least one projection, said steel section extending through said roll and resiliently engaging the two ends of said spring bow means, said roll being rotatably mounted on said steel section of which the projection engages said recess.

11. A windshield wiper according to claim 10, in which said steel section is a square steel section.

* * * * *